(No Model.)
R. O. TOOLE.
STEERING APPARATUS.
No. 282,805. Patented Aug. 7, 1883.
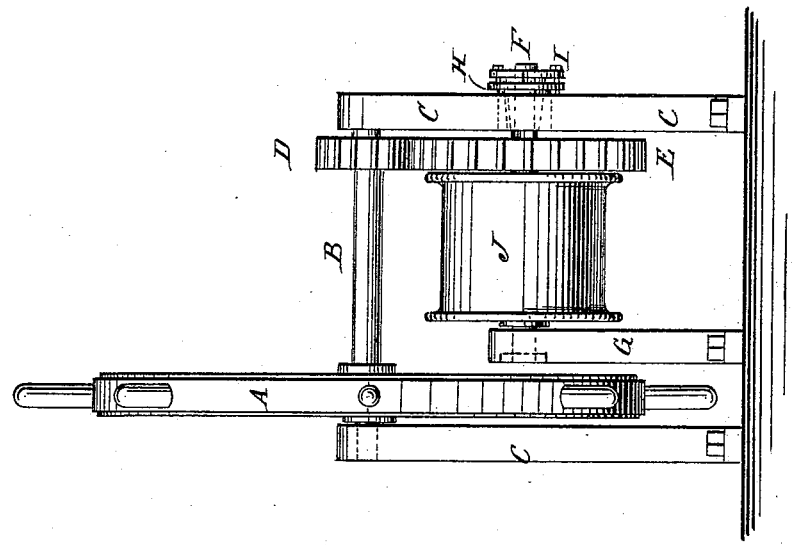
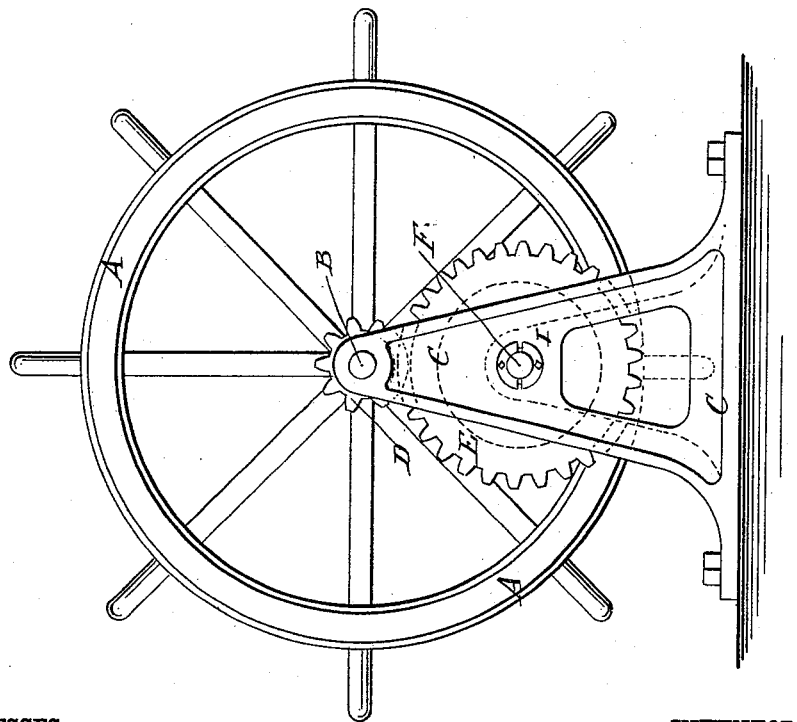
WITNESSES:
Chas. Nida
C. Sedgwick
INVENTOR:
R. O. Toole
BY Munn & Co
ATTORNEYS.

UNITED STATES PATENT OFFICE.

RICHARD O. TOOLE, OF PERTH AMBOY, NEW JERSEY.

STEERING APPARATUS.

SPECIFICATION forming part of Letters Patent No. 282,805, dated August 7, 1883.

Application filed December 8, 1882. (No model.)

*To all whom it may concern:*

Be it known that I, RICHARD O. TOOLE, of Perth Amboy, in the county of Middlesex and State of New Jersey, have invented a new and useful Improvement in Steering Apparatus for Vessels, of which the following is a full, clear, and exact description.

Reference is to be had to the accompanying drawings, forming part of this specification, in which similar letters of reference indicate corresponding parts in both the figures.

Figure 1 is a front elevation of my improvement. Fig. 2 is a side elevation of the same.

The object of this invention is to facilitate the steering of vessels.

With the steering-wheel shaft is connected, by a pair of gear-wheels, a drum to receive the rudder-chains, the said drum being placed upon a bolt or shaft connected at one end with the rudder-wheel frame, and at the other end with a bracket attached to the vessel's deck, whereby the labor of steering the vessel will be greatly lessened, as will be hereinafter fully described.

A represents the steering-wheel, the shaft B of which revolves in bearings in the frame C, secured to the deck of the vessel in the ordinary manner.

To the shaft B is attached a small gear-wheel, D, the teeth of which mesh into the teeth of a large gear-wheel, E. The gear-wheel E is attached to a shaft or bolt, F, one end of which revolves in a bearing in the frame C, and its other end revolves in a bearing in a frame or bracket, G, attached to the deck of the vessel in such a position that space will be left for the steering-wheel A between the said bracket G and the frame C, as shown in Fig. 2. The bolt or shaft F is secured in place by a head upon one end, and a nut, H, and jam-nut I screwed upon its other end. If desired, the bolt or shaft F can be stationary, and the gear E can revolve upon it.

With the gear-wheel E is rigidly connected a drum, J, to which the rudder-chains are designed to be attached, and which has flanges formed around its ends to keep the rudder-chains in place upon it.

With this construction the rudder can be controlled and operated by a single man with great ease, so that the labor of steering the vessel will be greatly lightened.

Having thus fully described my invention, what I claim as new, and desire to secure by Letters Patent, is—

In a steering apparatus, the combination, with the spur-wheel E and drum J, rigidly attached to one side thereof, of the shaft F, arranged in bearings C G, having a head at one end, a screw-thread at the other, and nuts H I, working on said screw-thread, as and for the purpose specified.

RICHARD O. TOOLE.

Witnesses:
JAMES T. GRAHAM,
C. SEDGWICK.